March 4, 1941. O. F. FUHRHOP 2,233,837
ROTATING PICKUP BRUSH FOR COMBINE HARVESTERS
Filed Dec. 2, 1939 2 Sheets-Sheet 1
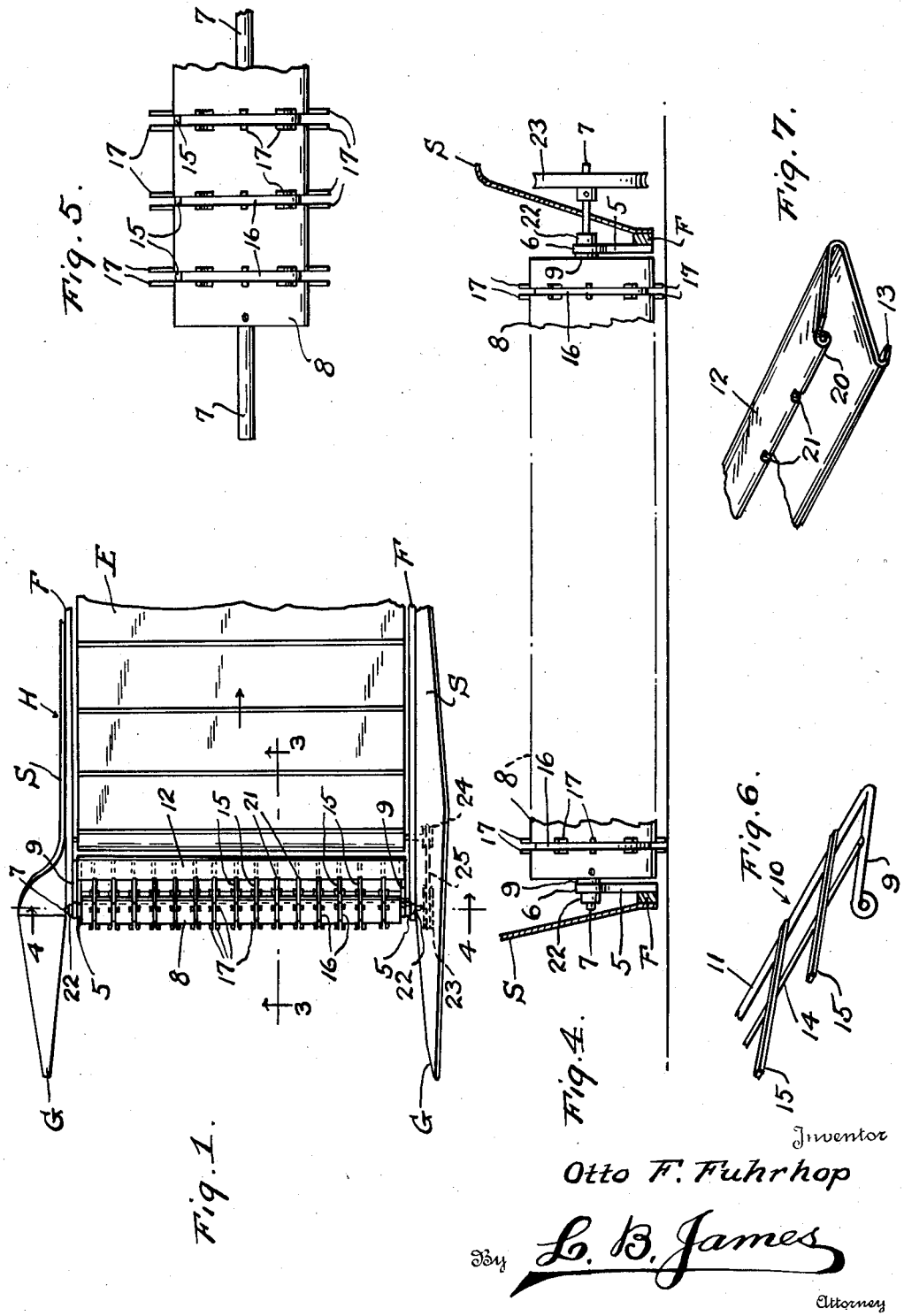
Inventor
Otto F. Fuhrhop
By L. B. James
Attorney

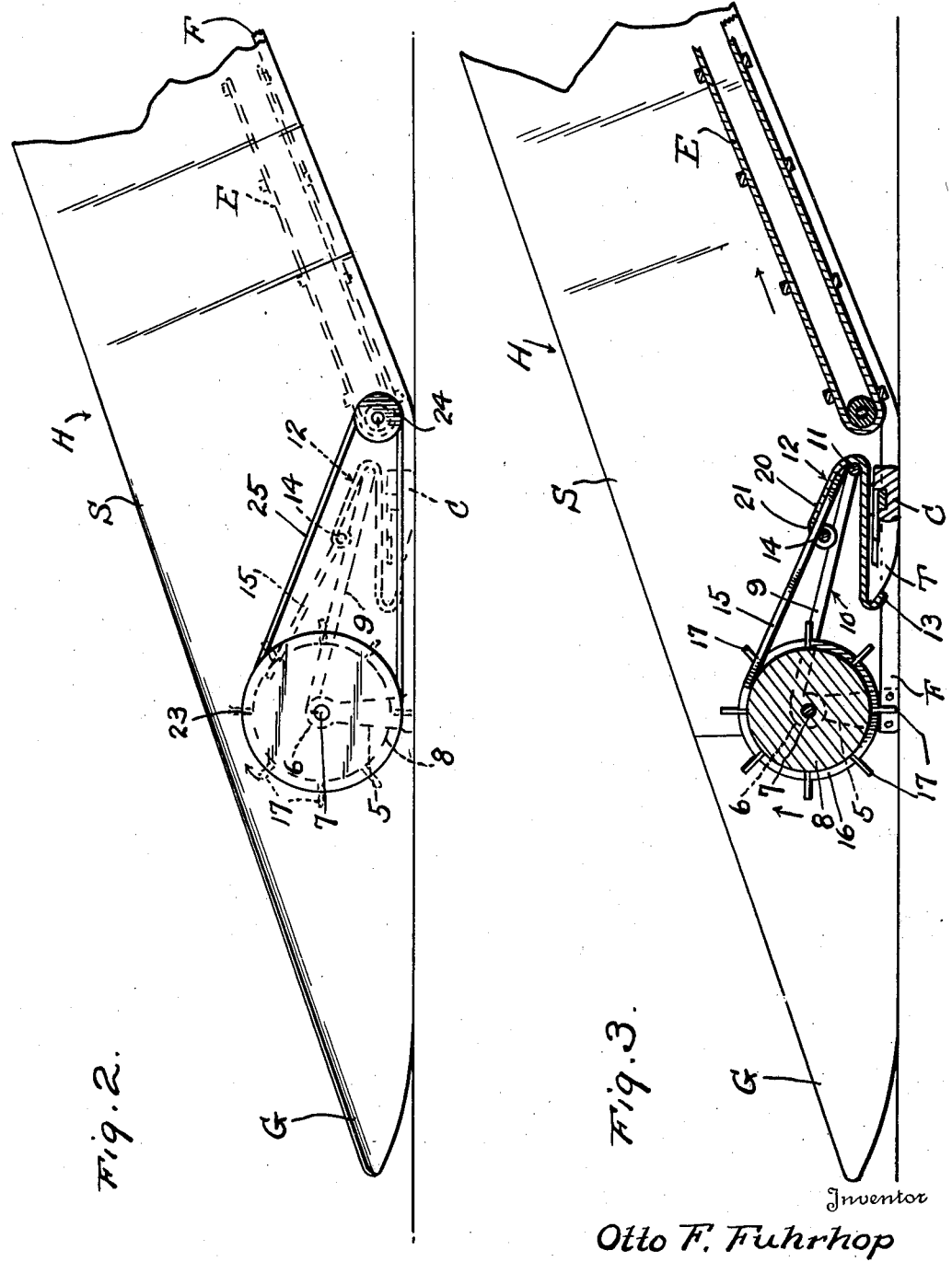

UNITED STATES PATENT OFFICE 2,233,837

ROTATING PICKUP BRUSH FOR COMBINE HARVESTERS

Otto F. Fuhrhop, Monroe Township, Henry County, Ohio

Application December 2, 1939, Serial No. 307,199½

6 Claims. (Cl. 56—364)

This invention relates to combine harvesters and more particularly to a rotating pickup brush.

The primary object of this invention resides in the provision of a rotating pickup brush for combine harvesters adapted to be readily secured to and removed from combine harvesters without disassembling certain elements of the same.

Another object of this invention resides in the provision of a rotating pickup brush for combine harvesters adapted to obviate the present necessity of disassembling certain parts of the harvester in applying it thereto.

A further object of this invention resides in the particular association of the rotating pickup brush with the adjuncts thereof.

A still further object of this invention resides in the particular construction of the rotating pickup brush.

Aside from the aforesaid objects this invention resides in the particular construction of the yoke-shaped support and association of elements carried thereby.

Among the many objects of this invention is the particular association of the yoke-shaped support with the original cutting bar of the harvester.

With these and other objects in view this invention resides in certain novel features of construction and arrangement of elements to be hereinafter more particularly set forth in the specification, illustrated in the accompanying drawings and pointed out in the appended claims and, while the present disclosure depicts my present conception of the invention, the right is reserved to resort to such departures therefrom as fall within the spirit of the invention.

In the accompanying drawings forming a part of this invention:

Figure 1 is a plan view of the front portion of the cutter bar and elevator of a combined harvester showing this invention secured thereto, the conventional reel of the harvester being omitted.

Figure 2 is an enlarged side view thereof.

Figure 3 is an enlarged sectional view thereof approximately on line 3—3 of Figure 1.

Figure 4 is an enlarged sectional view approximately on line 4—4 of Figure 1.

Figure 5 is an enlarged front view of a portion of the pickup brush.

Figure 6 is a detail perspective view of the yoke-shaped support and clearing fingers.

Figure 7 is a detail perspective view of the deflecting guard.

In the present embodiment of this invention the letter H represents a conventional combine harvester which among other cooperating elements, consists of a frame F having sides S disposed between which is the usual elevating conveyor E mounted directly to the rear of the usual cutter bar C operated by the ordinary means (not shown).

Suitably disposed between the forward ends, indicated at G, of the sides S are standards 5 having their free ends 6 apertured to form journal bearings adapted to accommodate a shaft 7 upon which is secured a rotating pickup brush 8 or other similar element capable of performing like functions.

The rotating pickup brush, through the instrumentality of the aforesaid shaft thereof, is rotatably mounted in arms 9 of a yoke-shaped support 10 the base 11 of which is secured within a substantially V-shaped deflecting guard 12 having a lip 13 on its lower side preferably adapted to engage the guard teeth T of the cutter bar or other portion thereof to rigidly dispose the rear end of the yoke-shaped support and deflecting guard over the cutter bar and in front of the elevating conveyor.

Extending laterally of the yoke-shaped support in the rear of the pickup brush and secured to the arms of the yoke-shaped support is a cross bar 14 upon which is secured the medial portions of laterally spaced fingers 15 of substantially rectangular configuration in cross section having their rear ends secured to the base 11 of the yoke-shaped support and their free ends disposed in annular peripheral grooves 16 formed in the pickup brush in order to cause the crop being harvested to be removed from the pickup brush as it rotates and slide rearwardly over the deflector guard onto the elevating conveyor.

The pickup brush is provided with a series of crop collecting pins 17 of substantially rectangular configuration in cross section disposed on opposite sides of each annular groove therein thus providing means to not only engage the crop beneath and in front of the pickup brush to throw it back onto the elevating conveyor but to prevent dislodgement of the free ends of the fingers from the annular grooves should they be deflected.

The upper free edge of the deflecting guard is rolled around the cross bar 14 as at 20 and is provided with spaced apertures 21 to permit the fingers to protrude therethrough.

In order to mount the pickup brush and deflector guard carrying the yoke-shaped support on the harvester the lip 13 is engaged with the guard teeth T and the shaft is inserted in the journal bearings of the supports whereupon collars 22 on the shaft are secured against each support leaving one end thereof projecting therefrom to accommodate a pulley 23, sprocket or other similar element herein shown as connected to a pulley 24 on the elevator shaft by a belt 25.

With this invention fully described it is manifest that a detachable rotating pickup brush for combine harvesters is provided which can be readily assembled on the harvester in the minimum time by unskilled labor without disturbing the coacting adjuncts of the harvester and, through the simplicity of construction and arrangement of elements thereof, the same can be cheaply manufactured and sold at a reasonable price.

Having thus described my invention what I claim and desire to protect by Letters Patent is:

1. In a harvester having a transversely extending cutter bar, a pickup cylinder mounted to revolve on an axis parallel to the cutter bar, said cylinder having a series of sets of pickup fingers spaced longitudinally of the cylinder, each set consisting of a series of pairs of said fingers, the pairs being spaced circumferentially around the cylinder and the fingers of each pair being spaced longitudinally thereof, and a series of clearing fingers supported to pass between the fingers of the pairs and cooperating therewith.

2. In a harvester having a transversely extending cutter bar, a pickup cylinder mounted to revolve on an axis parallel to the cutter bar, said cylinder having a series of sets of pickup fingers spaced longitudinally of the cylinder, each set consisting of a series of pairs of said fingers, the pairs being spaced circumferentially around the cylinder and the fingers of each pair being spaced longitudinally thereof, and a series of clearing fingers supported to pass between the fingers of the pairs and cooperating therewith, said cylinder having circumferential grooves each located between the fingers of the pairs and receiving the ends of the clearing fingers.

3. In a harvester having a transversely extending cutter bar, a pickup cylinder mounted to revolve on an axis parallel to the cutter bar, said cylinder having a series of sets of pickup fingers spaced longitudinally of the cylinder, each set consisting of a series of pairs of said fingers, the pairs being spaced circumferentially around the cylinder and the fingers of each pair being spaced longitudinally thereof, a series of clearing fingers supported to pass between the fingers of the pairs and cooperating therewith, and a frame pivotally mounted axially of the cylinder and extending toward the cutter bar, said clearing fingers being mounted on said frame.

4. In a harvester having a transversely extending cutter bar, a pickup cylinder mounted to revolve on an axis parallel to the cutter bar, said cylinder having a series of sets of pickup fingers spaced longitudinally of the cylinder each set consisting of a series of pairs of said fingers, the pairs being spaced circumferentially around the cylinder and the fingers of each pair being spaced longitudinally thereof, a series of clearing fingers supported to pass between the fingers of the pairs and cooperating therewith, a frame pivotally mounted axially of the cylinder and extending toward the cutter bar, said clearing fingers being mounted on said frame, and a cover plate carried by said frame and covering said cutter bar.

5. In a harvester having a transversely extending cutter bar, a pickup cylinder mounted to revolve on an axis parallel to the cutter bar, said cylinder having a series of sets of pickup fingers spaced longitudinally of the cylinder each set consisting of a series of pairs of said fingers, the pairs being spaced circumferentially around the cylinder and the fingers of each pair being spaced longitudinally thereof, a series of clearing fingers supported to pass between the fingers of the pairs and cooperating therewith, a frame pivotally mounted axially of the cylinder and extending toward the cutter bar, said clearing fingers being mounted on said frame, and a cover plate carried by said frame and covering said cutter bar, said cover plate having a downturned forward edge engaging the cutter bar and having a portion extending forwardly and upwardly from the rear of the plate and having a bead at its forward edge through which the clearing fingers extend.

6. A pickup brush for combine harvesters comprising a deflecting guard, a yoke-shaped support secured to the deflecting guard and having the free ends of its arms apertured, a cross-bar secured to the arms of the yoke-shaped support, laterally spaced fingers secured at their inner ends to the base of the yoke-shaped support with their medial portions secured to the cross-bar and their free ends extending forwardly of the deflecting guard, a pickup brush having a plurality of annular grooves in its periphery to receive the free ends of the aforesaid fingers, collecting pins carried by the pickup brush on opposite sides of the grooves, a shaft secured to the pickup brush and extending through the apertures in the arms of the yoke-shaped support, collars on the shaft, and a pulley on one end of the shaft.

OTTO F. FUHRHOP.